United States Patent
Lemke et al.

(10) Patent No.: US 9,327,149 B2
(45) Date of Patent: May 3, 2016

(54) AERIAL FIRE SUPPRESSION SYSTEM

(75) Inventors: Trent Lemke, Qualicum Beach (CA); A. Warren Wilcox, Missoula, MT (US)

(73) Assignee: Ascent Helicopters Ltd., Qualicum Beach (CA)

( * ) Notice: Subject to any disclaimer, the term of this patent is extended or adjusted under 35 U.S.C. 154(b) by 612 days.

(21) Appl. No.: 13/634,393

(22) PCT Filed: Mar. 17, 2011

(86) PCT No.: PCT/CA2011/000278
§ 371 (c)(1),
(2), (4) Date: Nov. 19, 2012

(87) PCT Pub. No.: WO2011/113144
PCT Pub. Date: Sep. 22, 2011

(65) Prior Publication Data
US 2013/0056230 A1   Mar. 7, 2013

Related U.S. Application Data

(60) Provisional application No. 61/314,646, filed on Mar. 17, 2010.

(51) Int. Cl.
*B64D 1/16* (2006.01)
*A62C 3/02* (2006.01)

(52) U.S. Cl.
CPC ............... *A62C 3/0242* (2013.01); *B64D 1/16* (2013.01)

(58) Field of Classification Search
CPC ...... A62C 3/0242; A62C 3/02; A62C 3/0228; A62C 3/0235; A62C 3/0292; B64D 1/16; B64D 1/18; B64D 1/00
USPC .......... 169/46, 54, 62, 30; 239/146, 148, 171, 239/722; 244/129.2
See application file for complete search history.

(56) References Cited

U.S. PATENT DOCUMENTS

| | | | |
|---|---|---|---|
| 3,661,211 A | 5/1972 | Powers | |
| 3,714,987 A * | 2/1973 | Mattson | B64D 1/16 137/533.13 |

(Continued)

FOREIGN PATENT DOCUMENTS

| | | |
|---|---|---|
| CA | 2289601 | 11/1998 |
| CA | 2671338 | 6/2008 |

OTHER PUBLICATIONS

International Searching Authority, Search Report and Written Opinion in corresponding International Application No. PCT/CA2011/000278 issued Jul. 8, 2011, 9 pages.

(Continued)

*Primary Examiner* — Justin Jonaitis
(74) *Attorney, Agent, or Firm* — Wood, Herron & Evans, LLP

(57) ABSTRACT

An aerial fire suppression system mountable to a helicopter fuselage is provided. The system having a tank divided into at least two compartments by a barrier. The base of each compartment having an outwardly opening door. The system also having a retractable snorkel unit attached to the tank for transferring liquid from a liquid source into the compartments. An inflatable seal minimizes the leakage of the liquid from the compartments at the junction where the outwardly opening door engages the tank. A modified cyclic controls the operation of the tank and the components thereof. Also described is a method of suppressing a fire using the aerial fire suppression system.

9 Claims, 7 Drawing Sheets

(56) References Cited

U.S. PATENT DOCUMENTS

| | | | |
|---|---|---|---|
| 3,754,601 A * | 8/1973 | Linkewich | 169/44 |
| 3,901,467 A | 8/1975 | Hawkshaw | |
| 4,090,567 A * | 5/1978 | Tomlinson | 169/53 |
| 4,804,157 A * | 2/1989 | Muscatell | 244/135 R |
| 6,125,942 A * | 10/2000 | Kaufman et al. | 169/53 |
| 6,209,593 B1 * | 4/2001 | Nichols, Sr. | 141/231 |
| 6,439,506 B1 | 8/2002 | Schlegel et al. | |
| 6,644,595 B2 * | 11/2003 | Ramage et al. | 244/136 |
| 2006/0175429 A1 * | 8/2006 | Lanigan et al. | 239/171 |
| 2010/0178176 A1 * | 7/2010 | Kenyon et al. | 417/53 |

OTHER PUBLICATIONS

International Bureau, International Preliminary Report on Patentability issued in corresponding PCT/CA2011/000278 dated Sep. 18, 2012, 7 pages.

* cited by examiner

AERIAL FIRE SUPPRESSION SYSTEM

FIELD OF INVENTION

The present invention relates to an aerial fire suppression system. In particular, the invention relates to a helicopter mountable aerial fire suppression system.

BACKGROUND OF THE INVENTION

Wildfires each year cause billions of dollars worth of damage worldwide. As the name suggests, these types of fires originate in nature and use the natural vegetation of the area as fuel. In most cases, a wildfire starts in a remote forested area, which is not easily accessible by land. Moreover, the extensive size of most wildfires makes suppression and control quite difficult. As such, the infrastructure required, and the techniques applied to suppress a fire in a rural or urban setting are of little value when attempting to suppress a wildfire.

One of the main differences between fighting a wildfire, compared to an urban or rural fire, is the use of aircraft to suppress the fire. Both fixed-wing and rotary aircraft have been used for this purpose. Fixed wing aircraft outfitted to receive and drop a quantity of water are commonly referred to as airtankers, whereas rotary aircraft outfitted for the same purpose are referred to as helitack helicopters.

Airtankers are capable of transporting and dropping a large volume of liquid, with the largest aircraft in the fleet today, such as the Evergreen Supertanker, having a capacity of 24,000 gallons. Such a capacity is effective in delivering liquid to a large area on a single pass of the airtanker. However, onloading of airtankers has to take place either at an airfield, while the aircraft is stationary, or by skimming a lake or large river. As such, an airtanker may be forced to fly long distances to refill after dropping its load on a fire.

Helitack helicopters provide greater maneuverability compared to airtankers and thus can be used for more than just dropping water on a fire. For example, the ability of a helicopter to hover above the ground allows it to transport supplies to crews on the ground. The ability to hover also allows a helitack helicopter to take on a fire suppressing load from a resource that would be unavailable to an airtanker, such as a small lake or reservoir.

A liquid, such as water or water combined with a fire retardant material, is typically transported to a drop zone by either a Bambi bucket, or, airframe-mounted water tank or helitank. In the case of a helitank, the liquid is typically onloaded through a snorkel that is lowered from the helicopter into the liquid source. When not is use, the snorkel is attached to the fuselage, which presents some issues with respect to the aerodynamics and handling of the helicopter. In particular, these additions place the helicopter into what is known as restrictive status, which limits its airspeed, ability to carry passengers and perform multiple duties. Moreover, drop patterns for the liquid, other than a complete drop, are generally difficult to achieve with helitanks, since opening the door(s) causes the whole load to be dropped.

The water tanks on current helitack helicopters could be improved to provide a system that is easier to control, that does not impact the control and the aerodynamics of the helicopter and can provide different drop patterns depending on the situation.

SUMMARY OF THE INVENTION

It is an object of the invention to provide an aerial fire suppression system for mounting to a helicopter.

According to an aspect of the present invention there is provided an aerial fire suppression system for mounting to a helicopter fuselage. The system comprising: a tank divided into at least two compartments by a vertically extended barrier, wherein the base of each compartment comprises an outwardly opening door; a retractable snorkel unit attached to the tank for transferring liquid from a liquid source into the compartments; an inflatable seal for bridging the junction between at least a portion of the circumference of the outwardly opening door and the tank; and a cyclic comprising one or more inputs for independently operating at least the outwardly opening doors, the retractable snorkel and the inflatable seals.

In one embodiment, a valve and associated hose coupling are positioned on the tank for attaching a hose for unloading the contents of the tank.

In another embodiment, a cargo hook is attached to the tank.

In a further embodiment, a foam injection system for injecting a foam into one or more of the compartments can be provided within the system.

According to a further aspect of the present invention, there is provided a retractable snorkel unit for transferring liquid from a liquid source into a helitank. The retractable snorkel comprising: a reel comprising an inlet and an outlet; a flexible hose attached at one end to the inlet of the reel and the other end connected to a pump; and an actuator connected to the reel for revolving the reel about a central axis, whereby revolving the reel about the central axis causes the flexible hose to either be wound or unfurled from the reel.

In one embodiment, the retractable snorkel unit further comprises an attachment point for attaching the unit to the tank.

In another embodiment, the actuator is a hydraulic motor.

In a further embodiment, the retractable snorkel unit further comprises a conduit connecting the outlet of the reel to the tank.

According to a further aspect of the present invention, there is provided a cyclic for operation of the aerial fire suppression system comprising a tank divided into at least two compartments by a vertically extended barrier, wherein the base of each compartment comprises an outwardly opening door; a retractable snorkel unit attached to the tank for transferring liquid from a liquid source into the compartments; an inflatable seal for bridging the junction between at least a portion of the circumference of the outwardly opening door and the tank. The cyclic comprising: an ergonomic grip for attachment to a shaft or flight stick mounted to the fuselage of a helicopter; one or more user inputs positioned on the ergonomic grip for controlling the outwardly opening doors; the retractable snorkel unit and the inflatable seals.

In one embodiment, the cyclic further comprises a user input positioned on the ergonomic grip for controlling a foam injection system connected to one or more of the compartments.

In another embodiment, warning and system indicator lights are provided on the cyclic.

According to a further aspect of the present invention, there is provided a method of suppressing a fire using the aerial fire suppression system as described above. The method comprising the steps of: deploying a hose from the retractable snorkel unit into a liquid source; transferring liquid from the liquid source into the tank; retracting the hose from the liquid source; and opening at least one of the outwardly opening doors to release the contents of the compartment onto the fire.

In an embodiment, the method further comprises the step of injecting foam into at least one of the compartments prior to opening the outwardly opening doors.

In another embodiment, both outwardly opening doors are released at approximately the same time.

According to yet a further aspect of the present invention, there is provided a method of suppressing a fire using the aerial fire suppression system described above, comprising the steps of: deploying a hose from the retractable snorkel unit into a liquid source; transferring liquid from the liquid source into the tank; retracting the hose from the liquid source; and deflating at least a portion of one of the inflatable seals to release the contents of the compartment onto the fire.

In an embodiment, the method further comprises the step of injecting foam into at least one of the compartments prior to opening the outwardly opening doors.

In another embodiment, both inflatable seals are deflated at approximately the same time.

BRIEF DESCRIPTION OF THE DRAWINGS

These and other features of the invention will become more apparent from the following description in which reference is made to the appended drawings wherein.

DETAILED DESCRIPTION

Figure 1:
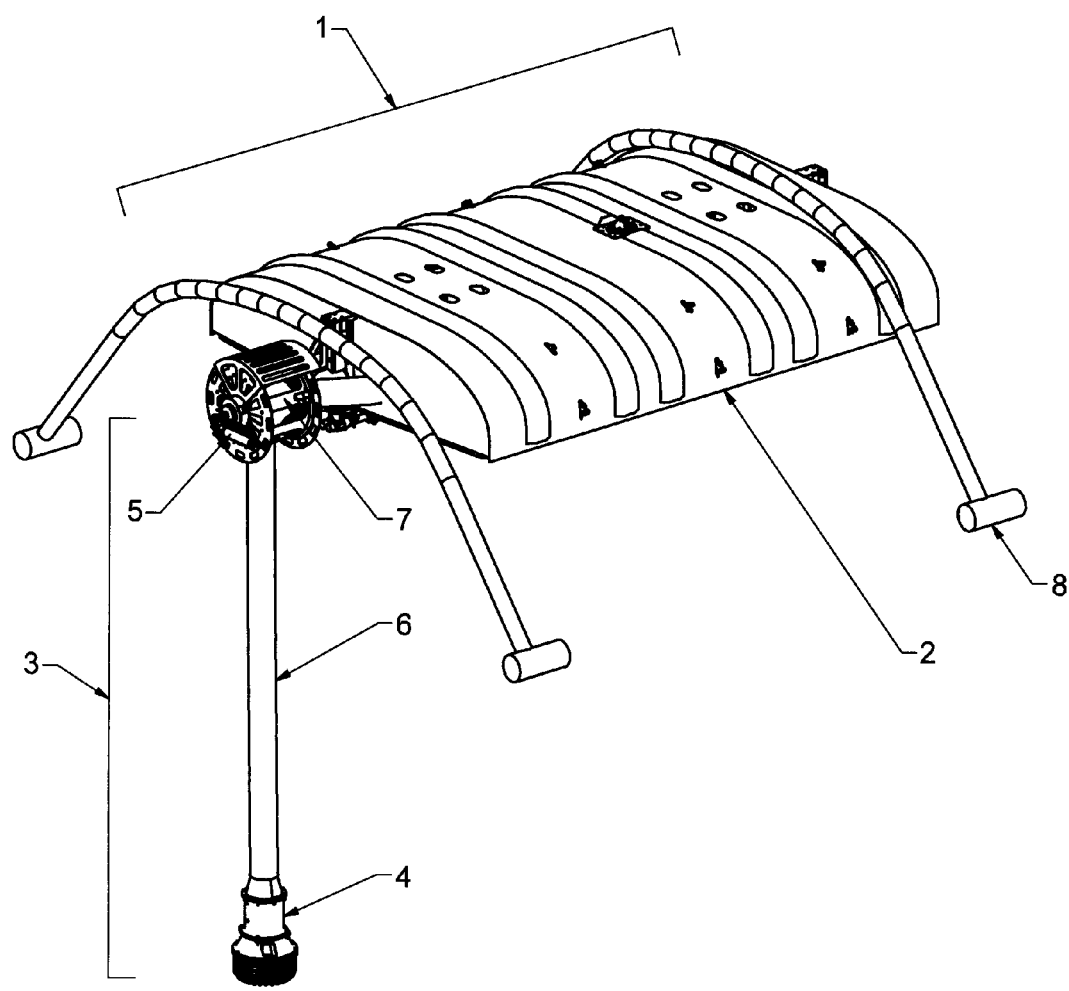
FIG. 1 shows a perspective view of an aerial fire suppression system in accordance with an embodiment of the present invention.
Figure 2:
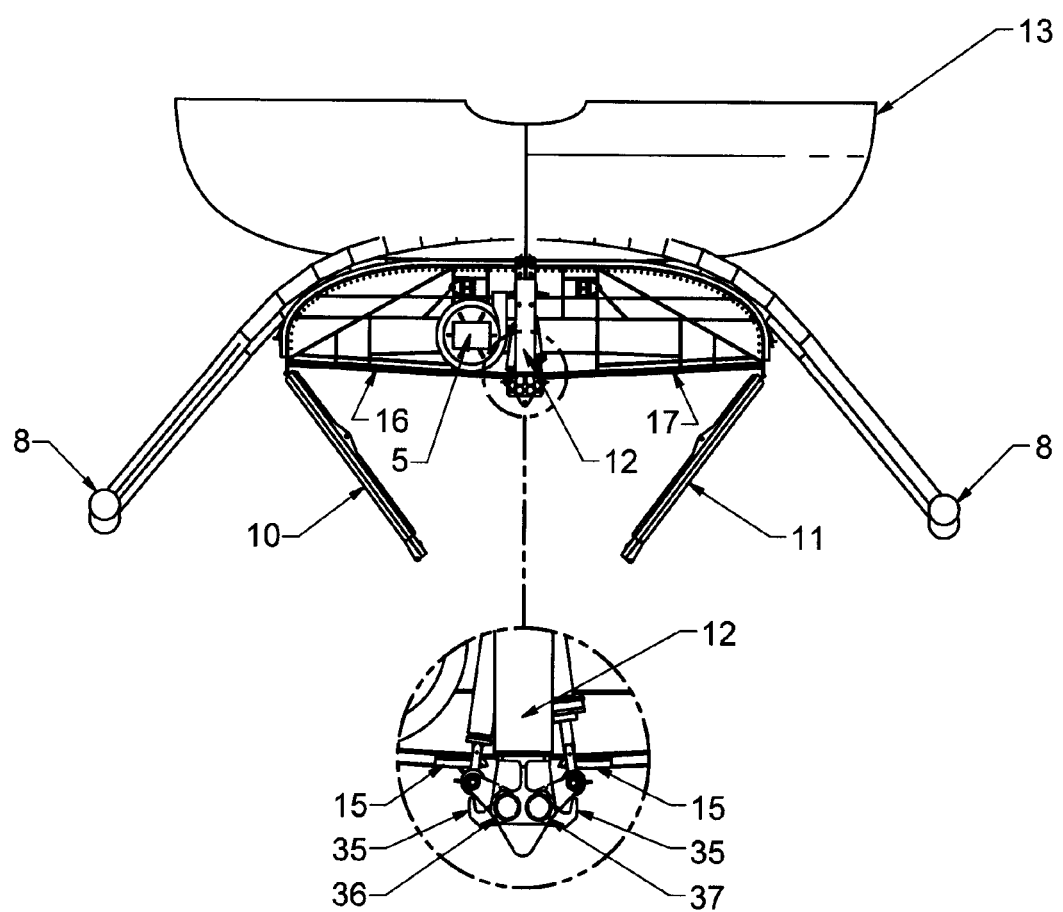
FIG. 2 shows a cross-sectional view of an aerial fire suppression system in accordance with a further embodiment of the present invention.
Figure 6:
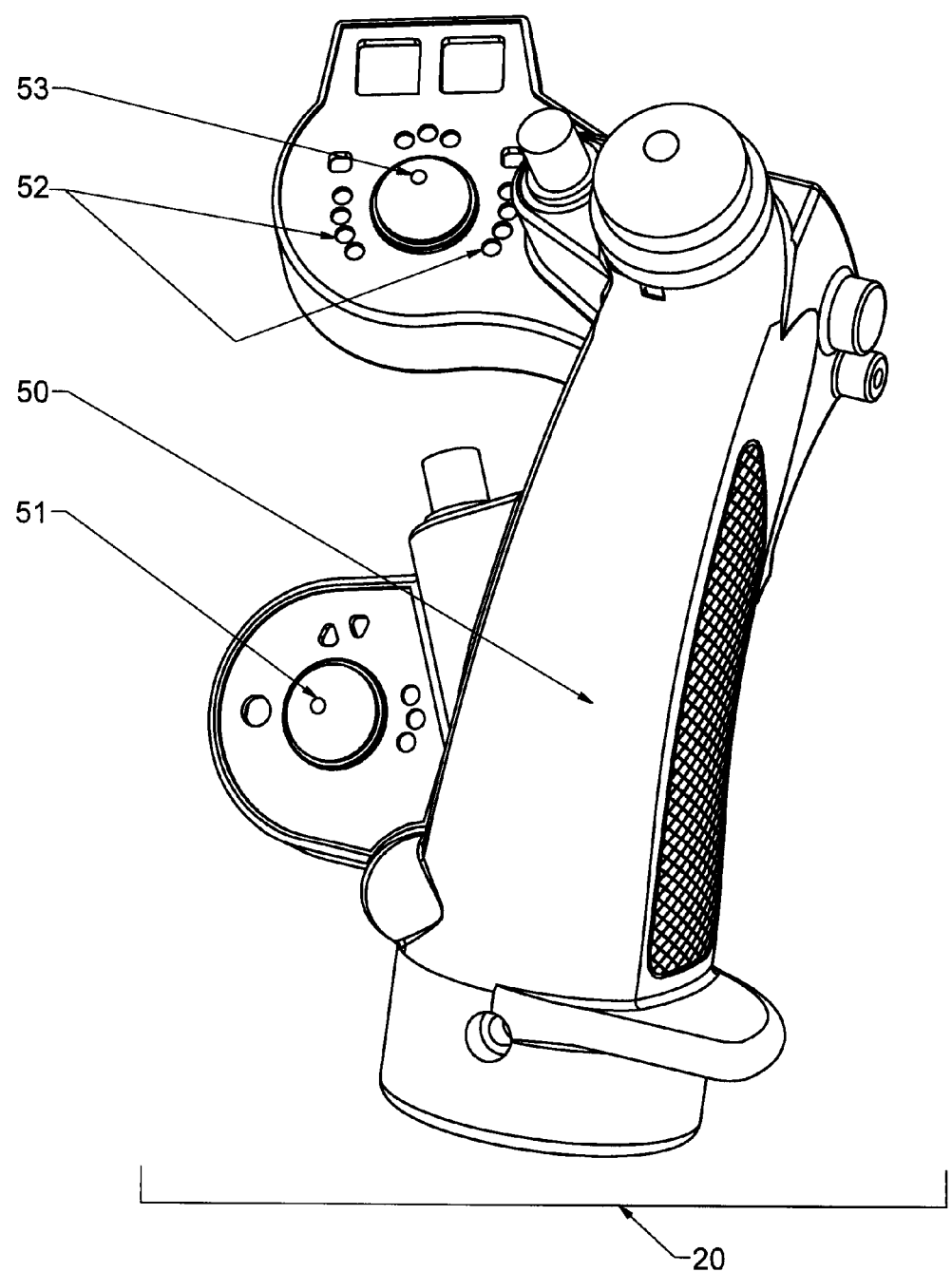
FIG. 6 a further embodiment of the present invention.

As shown in FIGS. 1 and 2, the aerial fire suppression system 1 is mounted to the underside of a helicopter fuselage 13 between the landing skids 8. The system 1 can be mounted directly to the fuselage 13 or indirectly through a bracket connected to the landing skids 8. The aerial fire suppression system 1 comprises a tank 2, a retractable snorkel unit 3, an inflatable seal 15 (FIG. 2) and cyclic 20 (FIG. 6).

Figure 4:
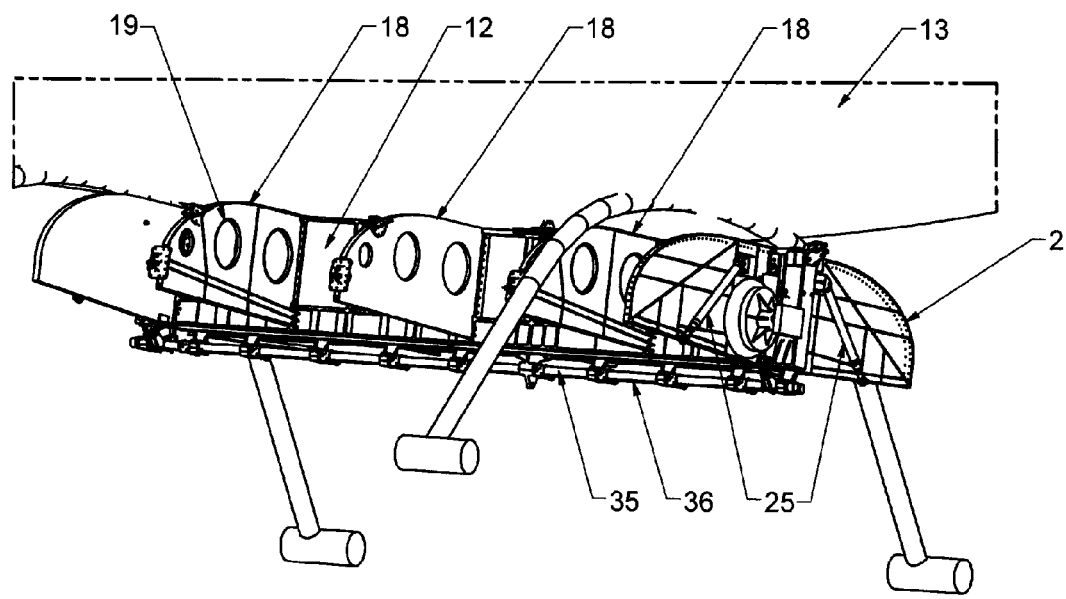
FIG. 4 shows a cutaway view of a tank in accordance with a further embodiment of the present invention.

The tank 2 of the aerial fire suppression system 1 is divided into at least two compartments 16, 17 by a barrier 12, which extends longitudinally through the length of the tank 2 and vertically through the height of the tank 2. In order to maintain the aerodynamics of the helicopter, it is preferred that the tank be divided into only two compartments, however, more than two compartments may be provided within the tank. In conjunction with the outwardly opening doors 10, 11, the barrier 12 allows for the independent or systematic release of the contents from each of the compartments 16, 17. As shown in the cutaway of FIG. 4, each compartment 16, 17 can be subdivided by one or more baffles 18. In addition to providing structural support for the tank 2, the baffles 18 limit the oscillation of the load from the front of the tank 2 to the back of the tank 2. Such oscillations, while the helicopter is airborne, can significantly affect the aerodynamics of the aircraft, putting both the pilot and ground crew at risk. To assist in a more even load distribution in each of the compartments 16, 17, cut-outs 19 are provided in the baffles 18 so that the load can be evenly distributed amongst each of the subdivisions in the compartments 16, 17.

In one embodiment, the tank 2 is capable of retaining 350 gallons (US) of liquid or a combination of liquid and one or more additives, such as foam concentrate. This amount is equally divided between the two compartments 16, 17. However, depending on the size of the helicopter to which the tank 2 is attached, the size of the tank 2 can either be increased or decreased from the standard 350 gallon size.

The tank 2 and the components thereof should be manufactured from a material that is anti-corrosive, rigid and lightweight. For example, the tank 2 can be made from reinforced glass composite structure, carbon fiber, aluminum, other metals or a combination of the above. In a preferred, but not limiting, embodiment the tank 2 is made from a glass composite shell with an aluminum frame. More preferably, the tank 2 is made from carbon fiber.

Figure 3:
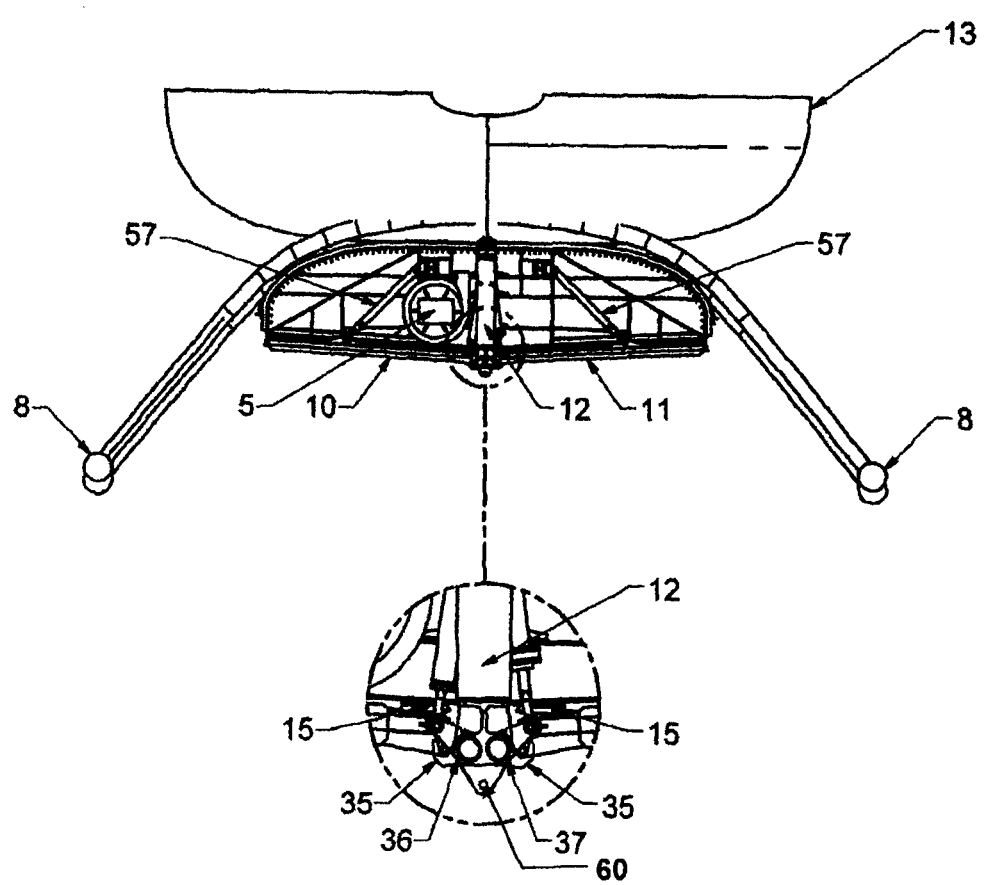
FIG. 3 shows a cross-sectional view of an aerial fire suppression system in accordance with an additional embodiment of the present invention.

The base of each compartment comprises an outwardly opening door 10 or 11 (FIG. 2). As shown in FIGS. 2 and 3, the doors 10, 11 are preferably hinged longitudinally along the side of the door that comes into contact with the tank 2. Having the doors 10, 11 hinged in this manner allows for the rapid deployment of the contents of the compartments 16, 17, which is desirable for most situations. Nevertheless, different spray and release patterns may be achieved by having the hinged side of the door along the barrier 12.

The doors 10, 11 are held in place, or the closed position, by a series of latches 35 positioned on or near the barrier 12. Alternatively, if the doors are hinged along the barrier 12, the latches may be positioned on or near the side of the door that comes into contact with the tank 2. In a preferred, but not limiting, embodiment, the latches 35 are interspaced along two rails 36, 37 that run the length of the tank 2 beneath the barrier 12. The latches 35 have corresponding mating elements positioned on the doors 10, 11. The latches 35 and corresponding mating members engage when the doors 10, 11 are shut to prevent the accidental opening of the doors.

In order to release the door, the pilot pre-selects the door(s) to be opened on the cyclic prior to designating drop location. At the drop location, the pilot pushes one of the user inputs on the cyclic, which causes an electrical signal to be sent to the system that activates a hydraulic valve which in turn operates a hydraulic door lock actuator (not shown) and pneumatic valve to operate the pneumatic door open actuators 57. Hydraulic door lock actuators are activated thus turning one or both of the rails 36, 37, to which the latches 35 are attached. One or both of the doors 10, 11 are pushed open via the pneumatic door actuators 57 and the weight of the contents of the tank 1 opens the doors 10, 11. It is preferred that the latches 35 interacting with the door 10 can be independently operated from those interacting with door 11. This allows for the contents of one compartment to be released, while the contents of the other compartment are maintained in the tank. In order to prevent the doors 10, 11 from swinging back and forth, once released from the latches 35, a mechanical actuator 25, such as a hydraulic cylinder, can be provided to minimize any uncontrolled movement. Moreover, a mechanical actuator 25 can assist in the raising and lowering of the doors 10, 11 into position.

Once released from the latches 35, the doors 10, 11 are raised back into the closed position by essentially the reverse of what is described above for opening the doors 10, 11. For example, a timed sequence of events activates the pneumatics to close the door via the actuators and the hydraulic door lock actuators are activated to close and lock the latches 35.

In order to prevent leakage of the contents from the compartments, an inflatable seal 15 is provided to bridge the junction between at least a portion of the circumference of outwardly opening door 10 or 11, and the tank 2. Preferably, the inflatable seal 15 surrounds the whole circumference of the door. Alternatively, when the doors are hinged along the side of the door that comes into contact with the tank 2, the inflatable seal 15 can be positioned near the barrier 12. Similarly, when the doors are hinged near the barrier 12, the inflatable seal 15 can be placed along the opposite side near the shell of the tank 2. The inflatable seals 15 can be independently inflated or deflated through a pneumatic system. When fully inflated, the seals 15 provide a leak-proof barrier to allow the contents of the compartments 16, 17 to be maintained. However, while the doors remain in the closed position, the pressure within the seals 15 may be adjusted to allow for a gradual, or controlled, release of the contents of the compartments 16, 17. Instead of deluging the target by opening the doors 10, 11 completely, the controlled release of pressure from the seals 15 allows for more precise and intricate spray drop patterns to be achieved.

Figure 5:
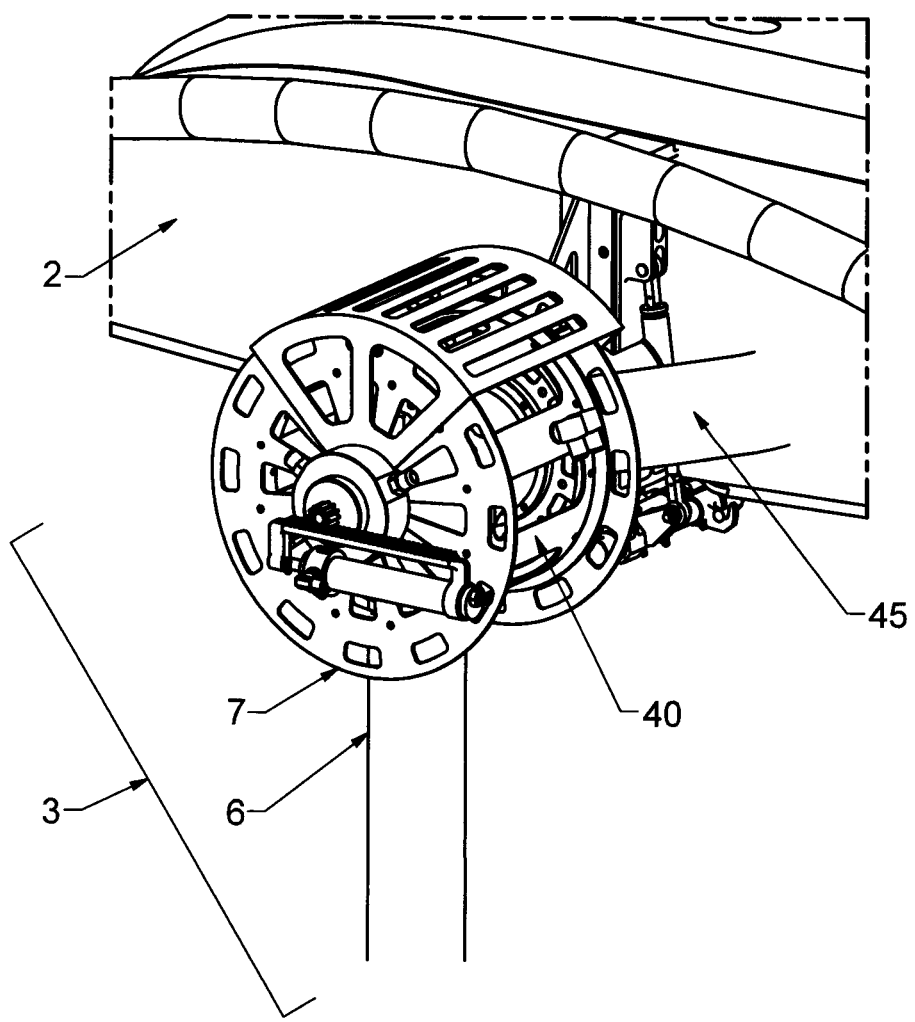
FIG. 5 shows a perspective view of a retractable snorkel unit in accordance with a further embodiment of the present invention.
Figure 7:
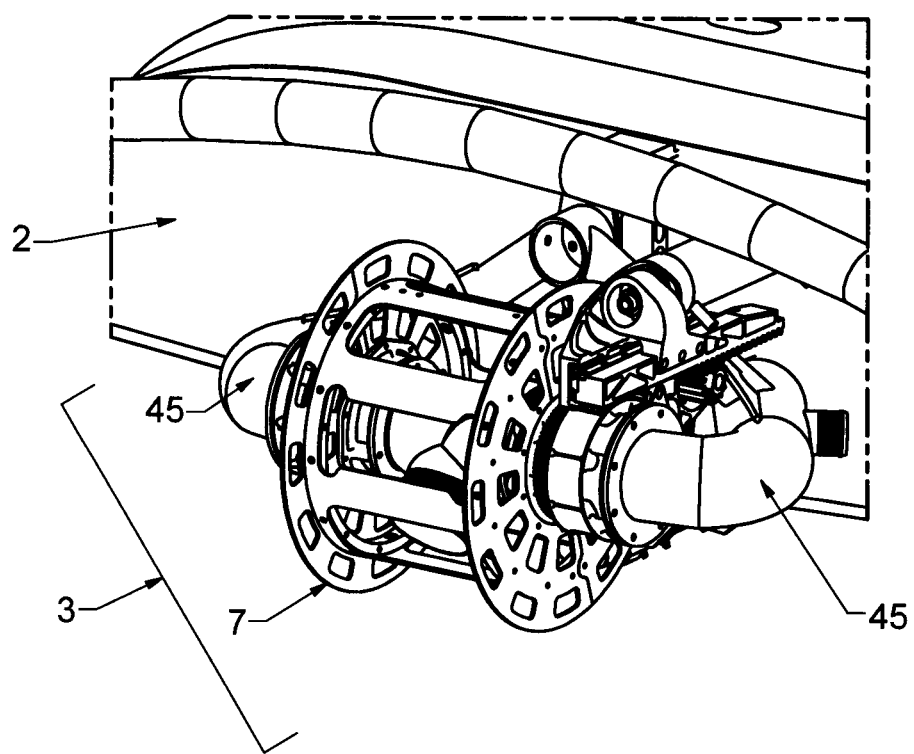
FIG. 7 Shows a perspective view of a retractable snorkel unit in accordance with a further embodiment of the present invention.

The compartments 16, 17 of the tank 1 are filled through a retractable snorkel unit 3. The snorkel unit 3 comprises a reel 7, a flexible hose 6 and a motor 5 attached to the tank 1 (FIG. 5). The reel 7 has a central drum 40 in which the flexible hose 6 can be wound around. The one end of flexible hose 6 attaches to the drum 40 of the reel 7 at a position surrounding an inlet provided on the reel 7. The inlet (not shown) provides access to a channel that runs through the drum 40 and exits through an outlet (not shown) on the drum 40. A fitting 45 connects the outlet to the tank 2. The actuator 5 is capable of turning the reel 7 bidirectionally, in order to either deploy or retract the flexible hose 6. Although the snorkel unit 3 is shown positioned in front of the tank 2 and the central axis of the reel 7 running longitudinally through the tank 2 in FIG. 5, it is possible to position the snorkel unit 3 such that the central axis of the reel 7 is perpendicular to the longitudinal axis of the tank 2, as shown in FIG. 7. In such an arrangement, the snorkel unit 3 can be placed in a housing 72 that is separate from the tank 2

As mentioned above, the flexible hose 6 is attached to the drum 40 at one end and is attached to a pump 4 at the other. The pump 4 is typically either a centrifugal or axial flow pump. Either of which can be driven hydraulically or electrically. It is generally preferred that the pump can load the compartments to capacity in under 30 seconds, and more preferably under 20 seconds.

In the liquid acquisition phase of operation, the motor 5 drives the reel 7 to unfurl or deploy the flexible hose 6 at the source of the liquid being loaded into the tank 2. The pump 4 is submerged into the liquid and then activated to begin the transfer of the liquid from the source to the tank 2. Once a desired amount of liquid is transferred into the tank 2, the pump 4 is shut-off and the motor 5 of the retractable snorkel unit 3 is activated to wind or retract the flexible hose 6 around the reel 7. Since the flexible hose 6 is wound around the reel 7, when not in use, the impact of the snorkel unit 3 on the flight dynamics of the helicopter will be minimized.

Depending upon the situation and the type of fire being tackled, it may be advantageous to spike the liquid in the compartments with a fire retardant foam. In this case, a foam injection system may be added to the tank in order to inject foam into the liquid either prior to or during the unloading process. In the latter, the injection system is a timed event utilizing a pump injecting a concentrated liquid into the tank immediately prior to unloading. The combination of the concentrated liquid and water forms a foam through agitation of the two substances. The agitation occurs when the combined liquid and concentrate is released or dropped on the designated target.

Liquid can also be transferred from one location to another in a controlled manner using the aerial fire suppression system 1. In this case, an outlet and hose coupling are provided on tank 2 to provide access to one or more of the compartments. A standard fire hose, or the like, can be attached to the hose coupling and dropped down to a ground crew to fill a reservoir. Liquid can be pumped from the compartment by a hydraulically driven centrifugal pump or the like. This feature allows for the transfer of water from one source to a remote area, which may be both away from a water source and difficult to reach by land.

The design of the tank 2, in particular the presence of a barrier 12 within the tank, allows for a cargo hook to be attached to the tank 2. In a non-limiting embodiment, an eyelet 60 is positioned on the barrier 12 extending below the tank 2. A cargo hook can be attached to the eyelet 60 and thus external cargo, such as a sling load or Bambi bucket, can be transported to a remote location.

At the least the outwardly opening doors 10, 11, the retractable snorkel unit 3 and inflatable seals 15 are controlled on the cyclic 20, as shown in FIG. 6. The cyclic 20 described herein is meant to replace the cyclic that is normally attached to a shaft or flight stick mounted to the floor of the helicopter. The cyclic 20 is comprised of an ergonomic grip 50 having normal flight controls, and one or more user inputs for controlling the operation of the aerial fire suppression system 1. An example of where the inputs can be positioned with respect to the ergonomic grip is shown in FIG. 6. However, the actual positioning of the inputs can be modified to accommodate the user's preference.

As shown in FIG. 6, an input 51, such as a control stick or button, is provided to control the onload capabilities of the system 1. During the onload, or liquid acquisition phase of operation, the retractable snorkel unit 3 is activated, deploying the flexible hose 6 and corresponding pump 4 into a liquid source. To monitor the amount of liquid being added to the tank 1, one or more indicators 52, such as light emitting diodes (LEDs), can be provided on the cyclic 20.

Either in conjunction with the input 51, or as a separate input 53, the offload capabilities of the system 1 can be controlled. To prevent the accidental release of the full contents of the tank 2, it may be advantageous to place control for rapid deployment of the contents of the tank 2 (as described above) on a separate input from the input for controlled release of the liquid. To provide rapid deployment of the contents of the tank 1, the input 51 or 53 signals a release mechanism on the outwardly opening doors 10, 11. Whereas controlled release of the contents is controlled by the user activating an input that signals for the release of pressure from the inflatable seals 15.

When a valve is present on the tank and/or when a foam injection system is provided, additional inputs may be provided on the cyclic 20 to control the operation of these aspects of the system 1. Alternatively, control of these functions may be combined within one of the existing inputs.

As additional safety measures for the system, manual or automatic release mechanisms may be provided on the cyclic 20 or elsewhere in the cockpit, to ensure that the contents of the tank 2 may be released in an emergency situation. In addition, warning or system indicator lights may be provided on the cyclic 20 to alert the pilot of any system failures or unsafe situations.

In one embodiment, the inputs are tied to printed circuit boards utilizing a bit string decoder without software and oscillators. Alternatively, a programmable logic controller (PLC) can be provided to control the system. Further still, a microprocessor can be provided, which will allow greater control of the system and release of the contents of the compartments. For example, use of a microprocessor permits adjustment of the drop pattern to accommodate for flight and environmental conditions and minimizes the signals and wires required to control the system.

One or more currently preferred embodiments have been described by way of example. It will be apparent to persons skilled in the art that a number of variations and modifications can be made without departing from the scope of the invention as defined in the claims.

What is claimed is:

1. An aerial fire suppression system for mounting to a helicopter fuselage, said system comprising:
    a tank divided into at least two compartments by a vertically extending barrier, wherein the base of each compartment comprises an outwardly opening door;
    at least one baffle positioned within each of the compartments, wherein the baffles extend vertically and are configured to limit oscillations of a load from a front of the tank to a back of the tank;
    wherein at least one of the baffles includes at least one cut-out provided for allowing fluid flow there through
    a retractable snorkel unit attached to the tank for transferring liquid from a liquid source into the compartments;
    an inflatable seal for bridging a junction between at least a portion of a circumference of the outwardly opening door and the tank; and
    a cyclic comprising one or more inputs for independently operating at least the outwardly opening doors, the retractable snorkel and the inflatable seals.

2. The aerial fire suppression system of claim 1, further comprising an outlet and associated hose coupling positioned on the tank for attaching a hose for unloading the contents of tank.

3. The aerial fire suppression system of claim 1 further comprising an eyelet attached to the tank.

4. The aerial fire suppression system of claim 1, further comprising a foam injection system for injecting a concentrate into one or more of the compartments.

5. The aerial fire suppression system of claim 1, wherein the outwardly opening doors are hinged longitudinally along the side of the door that comes into contact with the tank.

6. The aerial fire suppression system of claim 1, wherein the outwardly opening doors are hinged longitudinally along the vertically extending barrier.

7. The aerial fire suppression system of claim 1, wherein the inflatable seal surrounds the perimeter of the outwardly opening doors.

8. The aerial fire suppression system of claim 1, wherein the tank is made from a material selected from the group consisting of reinforced glass composite, carbon fiber, and aluminum, or a combination of any of these materials.

9. The aerial fire suppression system of claim 1, further comprising a series of latches positioned on the vertically extending barrier which engage the outwardly opening doors or on one or more rails that transverse the tank beneath the barrier for engaging the outwardly opening doors.

* * * * *